United States Patent [19]

Parker et al.

[11] Patent Number: 5,031,710
[45] Date of Patent: Jul. 16, 1991

[54] ELECTRONIC FISH SCALE

[75] Inventors: Owen Parker, Carson, Calif.; Robert W. Junghans, Golden Valley, Minn.

[73] Assignee: Annuities II, Golden Valley, Minn.

[21] Appl. No.: 385,347

[22] Filed: Jul. 25, 1989

[51] Int. Cl.[5] .......................... G01G 3/14; G01G 3/00
[52] U.S. Cl. .............................. 177/210 FP; 177/225
[58] Field of Search ............... 177/211, 225, 210 FP; 73/862.48

[56] References Cited

U.S. PATENT DOCUMENTS

| | | | |
|---|---|---|---|
| 1,407,078 | 2/1922 | Murray | 177/211 X |
| 3,241,626 | 3/1966 | Woodburn | 177/211 X |
| 4,342,038 | 7/1982 | Lemelson | 177/2 X |
| 4,660,666 | 4/1987 | Reder et al. | 177/211 X |
| 4,718,507 | 1/1988 | Howlett et al. | 177/210 FP |

Primary Examiner—George H. Miller, Jr.
Attorney, Agent, or Firm—Merchant, Gould, Smith, Edell, Welter & Schmidt

[57] ABSTRACT

An electronic fish scale having a spring connected to a hook to which the fish or other item to be weighed is attached. Attaching the weight to the hook causes linear displacement of the spring. A rigid coupling is attached to the spring and connected to a variable resistor such that movement of the spring results in a change in the effective resistance of the variable resistor. Electronic circuitry is interconnected with the variable resistor such that a signal is generated which is indicative of the effective resistance of the variable resistor. The generated signal is sampled and processed at a microprocessor having stored data corresponding to the weight equivalent to the variance in the variable resistor-dependent signal. A display receives a signal output from the microprocessor and displays and weight measured.

11 Claims, 5 Drawing Sheets

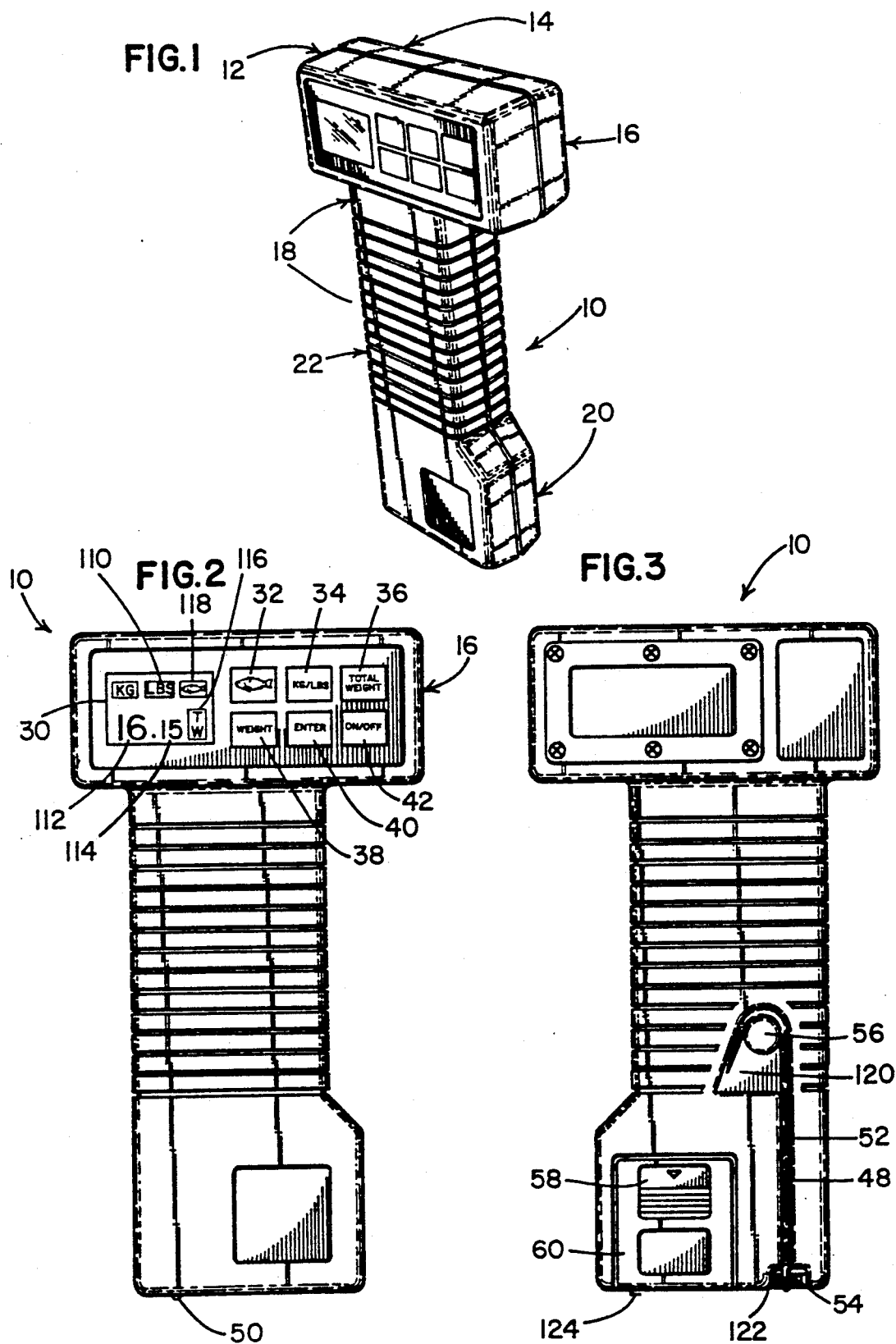

ELECTRONIC FISH SCALE

FIELD OF THE INVENTION

The present invention relates generally to an electronic fish scale and, more particularly, to an electronic fish scale including a spring means and a variable resistor for displaying and storing the weight of a fish.

BACKGROUND OF THE INVENTION

Traditional fish scales include scales indicating the weight of the fish to the user through the physical displacement of the spring. The user directly reads the weight corresponding to the displacement off of the scale connected to the spring. More recently, fish scales have been developed which include electronic circuitry. However, electronic scales currently on the market are believed to have a limited range of weights which are capable of being measured and displayed, have a limited number of features, and use relatively bulky and expensive components.

SUMMARY OF THE INVENTION

There is provided in accordance with the present invention an electronic fish scale comprising a spring means for generating linear response to a force imparted thereto, such as a fish to be weighed; a variable resistor; and a displacement indicating means rigidly connected to the spring means for displacement therewith in response to said force, said displacement indicating means further connected to the variable resistor such that the amount of change in the effective resistance of the variable resistor is substantially proportionate to the amount of physical displacement of the displacement indicating means. The scale further comprises an electronic circuit means for generating an electrical signal substantially indicative of the effective resistance of the variable resistor; and display means for converting the electrical signal generated by the electronic circuit means into a display substantially indicative of the force imparted to the spring means.

BRIEF DESCRIPTION OF THE DRAWINGS

FIG. 1 is a top, front and right side perspective view of the scale in accordance with the present invention;

FIG. 2 is a front elevation view thereof;

FIG. 3 is a rear elevation view thereof;

DESCRIPTION OF THE PREFERRED EMBODIMENT

Figure 4:
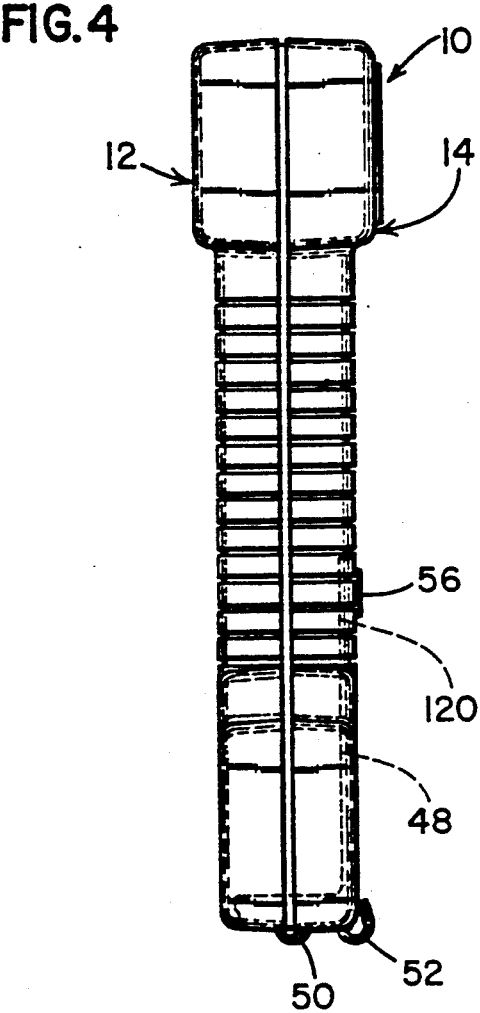
FIG. 4 is a right side elevation view thereof.

FIG. 1 shows an electronic fish scale 10 comprised of front and back molded plastic sections 12 and 14, respectively. The housing of the fish scale 10 comprises an upper display and control section 16, a middle handle section 18 and a lower base portion 20. The handle section 18 forms ridges and recessed 22 for improving the grip on the scale. The scale housing is watertight and generally floatable, and substantially encloses the spring and electronic circuitry.

FIG. 2 shows the LED display 30 of the electronic fish scale 10. In a preferred embodiment, the display 30 will indicate the unit of measurement, shown as pounds in FIG. 2 by the designation "LBS" 110. By activating the KG/LBS button 34, the display screen may be shifted between the display in pounds and a display in kilograms. The numerical display of the weight includes a pounds display 112 and an ounces display 114. When kilograms are displayed, the larger-sized designation 112 indicates kilograms, and the smaller-sized designation 114 indicates hundredths of a kilogram.

When the TOTAL WEIGHT button 36 is activated, the display 30 will display a total weight equalling the sum of one or more prior measurements taken by the fish scale. This mode is designated in the display by the "TW" indication 116.

The upper display portion 16 of scale 10 includes additional control buttons, including the "big fish" control 32, weight button 38, enter button 40, and on/off button 42, explained in further detail below. A looped end portion 50 of hook 48 used to hold the fish or other item to be weighed is exposed at the bottom of the scale 10.

FIG. 3 shows the back side of fish scale 10. The hook 52 for weighing the fish is shown in the stored position. The hook is held in place by a retaining member 56 which is attached to the fish scale housing. The hook is retained by the retaining member 56 within a recess formed in the housing. The recess includes a substantially linear portion 48 for retaining the neck of the hook, and a wider upper portion 120 for receiving the curved portion of the hook. The use of the recess and the retaining member secures the fish hook in a safe location.

The hook 52 is attached by a pivotable chain length 54 held in recess 122 formed in the base portion of the housing. The chain length 54 is connected to the spring (not shown) located within the housing. The hook 52 is sized appropriately for hooking and holding the fish or other item to be weighed.

The fish scale 10 also includes a compartment cover 60 for covering a compartment within the housing suitable for holding a tape measure. The cover may be removed by pressing on the cover detaching plate 58. The tape measure may be removed from the compartment for use, or may be mounted such that the tape measure end 124 is exposed on the outside of the housing, allowing use of the tape measure while the tape measure is secured within the compartment. The end of the tape measure 124 is located adjacent to hook 52 so that the length of the fish held on hook 52 may be easily determined.

Figure 5:
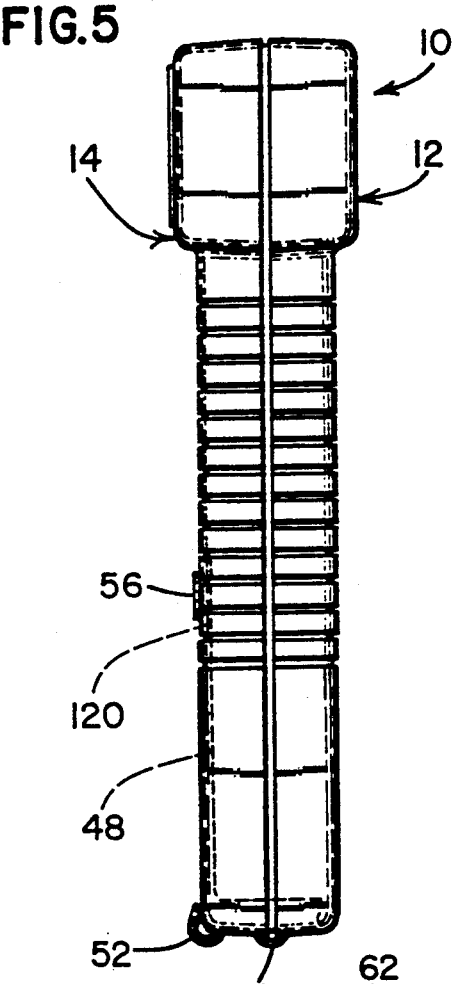
FIG. 5 is a left side elevation view thereof.

FIGS. 4 and 5 show side views of the scale 10. The retaining member 56 is shown slightly extending from the housing. The recesses 120 and 48 for holding the fish hook are indicated. Also shown is the curved opposite end of fish hook 52 connected by chain length 54 (not shown) to loop 50 connected to the spring scale (not shown).

Figure 6:
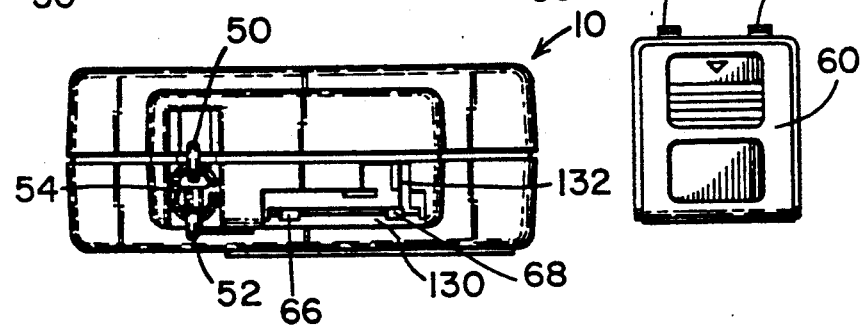
FIG. 6 is a top plan view thereof.

FIG. 6 shows a bottom view of the scale 10 with the tape measure compartment cover 60 removed. Removal of the tape measure compartment cover reveals a recess 130 for receiving the tape measure. The housing forms a slot 132 for receiving the end of the tape measure, indicated in FIGS. 3 and 7 at 124. Also shown is compartment cover 60 detached from the scale housing, including retaining projections 62,64. When the cover is attached to the housing, the retaining projections are received at recesses 66,68 of the scale housing.

Figure 7:
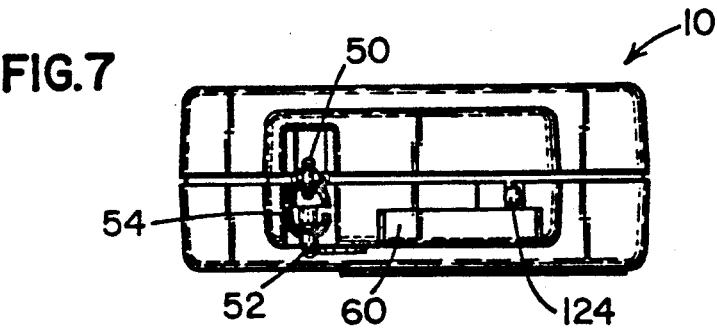
FIG. 7 is a bottom plan view thereof.

FIG. 7 shows a bottom view of the scale 10 with the compartment cover 60 in place, including the exposed end of the tape measure 124. The tape measure compartment cover 60 extends to the bottom of the housing as shown. Also shown is chain length 54, which links the bottom of the fish hook 52 to loop 50.

To use the fish scale, the on/off button 42 is pressed (see FIG. 2). The display will be activated, indicating whether kilograms or pounds are being displayed, and the most recent measurement will be displayed. To weigh a fish, the hook 52 is released from the retaining member 56 such that the hook hangs down below the scale housing. In the preferred embodiment, the display will automatically turn off after a few seconds if the scale is not used.

Once the hook is released and ready for weighing, the fish (or other item to be weighed) is hooked on the hook 52 and hung from below. The weight button 38 is then pressed, resulting in a display of "OOoo". Once the weight button 38 is depressed, the display 30 will display a limited number of interim readings of the weight of the fish until a final reading, signified by an audible beeping sound, is stored. That final value will be displayed in display 30. The value may be converted between kilograms and pounds by pushing the KG/LBS button 34.

To save an accumulated total of weights, for example, for a number of fish, the ENTER button 40 is pressed. Pressing the enter button will result in a display of an accumulated total of the weights selected to be added to the total weight sum. The display of the total weight is signified by the "TW" display 116 in screen 30. To display the total weight without entering the currently-displayed weight, the TOTAL WEIGHT button 36 is pressed. Pressing either the ENTER or TOTAL WEIGHT buttons will result in a temporary display of the total weight, with the display returning to the most-recently-recorded weight within a few moments.

The fish-shaped emblem on button 32 represents the "big fish" feature. By pushing button 32, the weight of the largest fish (or other item) is displayed. Display of this value is signified by the fish-like display 118 shown in FIG. 2 within display 30. This display is also temporary, with the display returning to the most recently measured weight within a few moments. If none of the buttons are activated within a few seconds, the display turns off automatically. However, the most recent weight may be redisplayed simply by activating the on/off button 42. The on/off button 42 may also be pressed to turn the display off.

Figure 8:
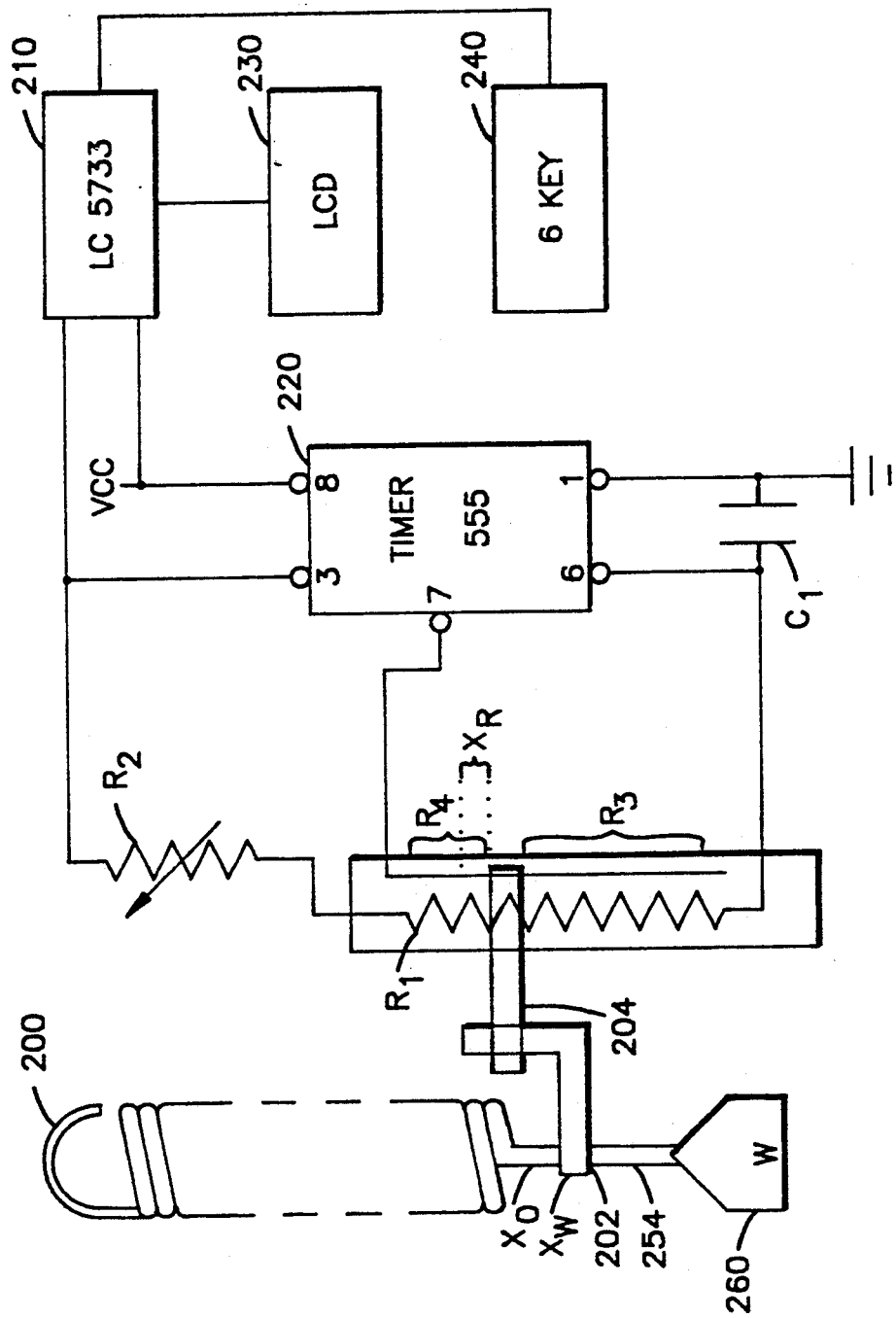
FIG. 8 is a schematic diagram of the electronic circuitry in accordance with the present invention as integrated with the spring.
Figure 11:
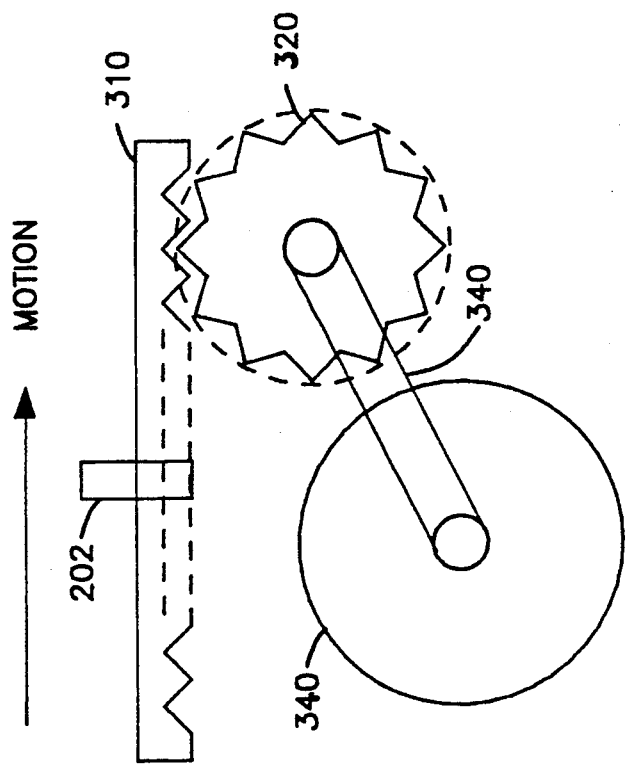
FIG. 11 is a side view of a multi-turned variable resistor gear arrangement capable of indicating displacement in accordance with the present invention.

FIG. 8 is a diagram showing a portion of the electronic circuitry of the electronic scale. A variable resistor $R_1$ is shown comprised of resistances $R_3$ and $R_4$. As shown in greater detail below, the spring used to measure the weight of a fish in accordance with the present invention will cause the variable resistance values $R_3$ and $R_4$ to change.

Typically, the variable resistance will be a sliding resistor. In a preferred embodiment, the resistor will be selected such that it will have a relatively long resistive element, such as 45 millimeters. Such a resistor will be able to handle, for example, all values outputted by a spring which indicate a linear movement of up to 35 millimeters when a weight of up to 30 pounds is applied. Use of such elements will allow a display of up to 30 pounds with a resolution of about 1 ounce. The accuracy of the scale is approximately plus or minus 5%.

The weight W260 applied to spring 200 will create a displacement of rigid coupling 202 rigidly connected to arm 254 of spring 200 according to the formula $F=kX$. The rigid coupling 202 will be located at a position designated Xo when no weight is applied to the spring. When a weight W is applied to the spring, the rigid coupling 202 will be displaced to the location designated Xw. This displacement will result in a corresponding displacement $X_R$ of the conductor 204 slidingly engaged with variable resistor $R_1$, $X_R$ is equal to the difference between Xw and Xo. The displacement $X_R$ increases the length of resistor $R_4$ and increases the value of the resistance of $R_4$. The displacement results in a corresponding reduction in the length of resistor $R_3$ and reduction in the value of the resistance of $R_3$. $R_4$ is connected in series between variable resistor $R_2$ and the timer 220. $R_3$ is connected in series between capacitor C1 and timer 220. The spring is interconnected with resistor $R_1$ such that the value of resistor $R_3$ is substantially linearly proportionate to the weight of the fish measured by the spring.

A typical value of the variable resistor $R_1$ is 500,000 ohms. For resolution of one ounce on a total scale of 30 pounds, this resistance corresponds to approximately 1,000 ohms per ounce. By way of example, C1 is chosen to be a one microfarad capacitor and the sampling rate by the microprocessor is approximately 0.1 ms. $R_2$ is a variable resistor provided to compensate for variations in the spring.

The timer 220 is a voltage controlled oscillator, for example a 555 IC. The timer 220 is responsive to a total resistance $R_T$ ($R_1$ plus $R_2$), which is a constant, as well as the varying resistance $R_3$. Capacitor C1 is selected such that a suitable time constant is obtained for both the total resistance $R_T$ and resistance $R_3$ for appropriate processing by the timer 220.

The time constant corresponding to the total resistance of the circuit, T1, equals $0.693 \times R_T \times C1$. The time constant corresponding to variable resistance $R_3$ is designated as T2 and is equal to $0.693 \times R_3 \times C1$.

Figure 9:
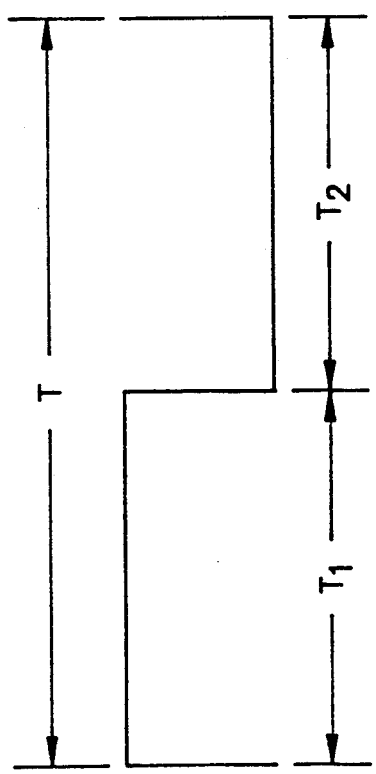
FIG. 9 is a diagram representing the output wave form of the voltage-controlled oscillator in accordance with the present invention.

A wave is outputted by the timer 220 having a high state having a substantially constant duration T1, and a low state having a variable duration T2 proportionate to $R_3$. An example of such a wave form is shown in FIG. 9. The total period of this wave, a square wave as outputted by timer 220, is equal to the sum of T1 and T2 and is designated as T.

Since T1 is proportionate to the total resistance $R_T$ ($R_1$ plus $R_2$) and T2 is proportionate to $R_3$, the following is true:

$$T2/T1 = R_3/R_T$$

The signal output by timer 220 is received by the four-bit microprocessor 210. A typical integrated circuit device suitable for this use is the LC 5733. The microprocessor 210 is programmed to repeatedly sample the output of the timer 220 for a predetermined period of time. During this sample period, the microprocessor counts the number of "low" readings and the number of "high" readings output from the timer 220. As the timer output is counted by the microprocessor, the number of low-value samples within a time period and the number of high-value samples within the same timer period are stored. This sampling will generate values indicative of the time periods T2 and T1.

T1 will depend on predetermined and constant values $R_T$ (equal to $R_1+R_2$) and C1. A typical value of T1 is 310 ms. That value will remain essentially constant when the scale is in use. The value of T2 varies with the weight applied to the spring. A typical value for T2 when no weight is applied to the spring is 40 milliseconds. A typical value for T2 when a weight of approximately 30 pounds or 13.57 kilograms is applied to the spring is 230 ms.

Figure 10:
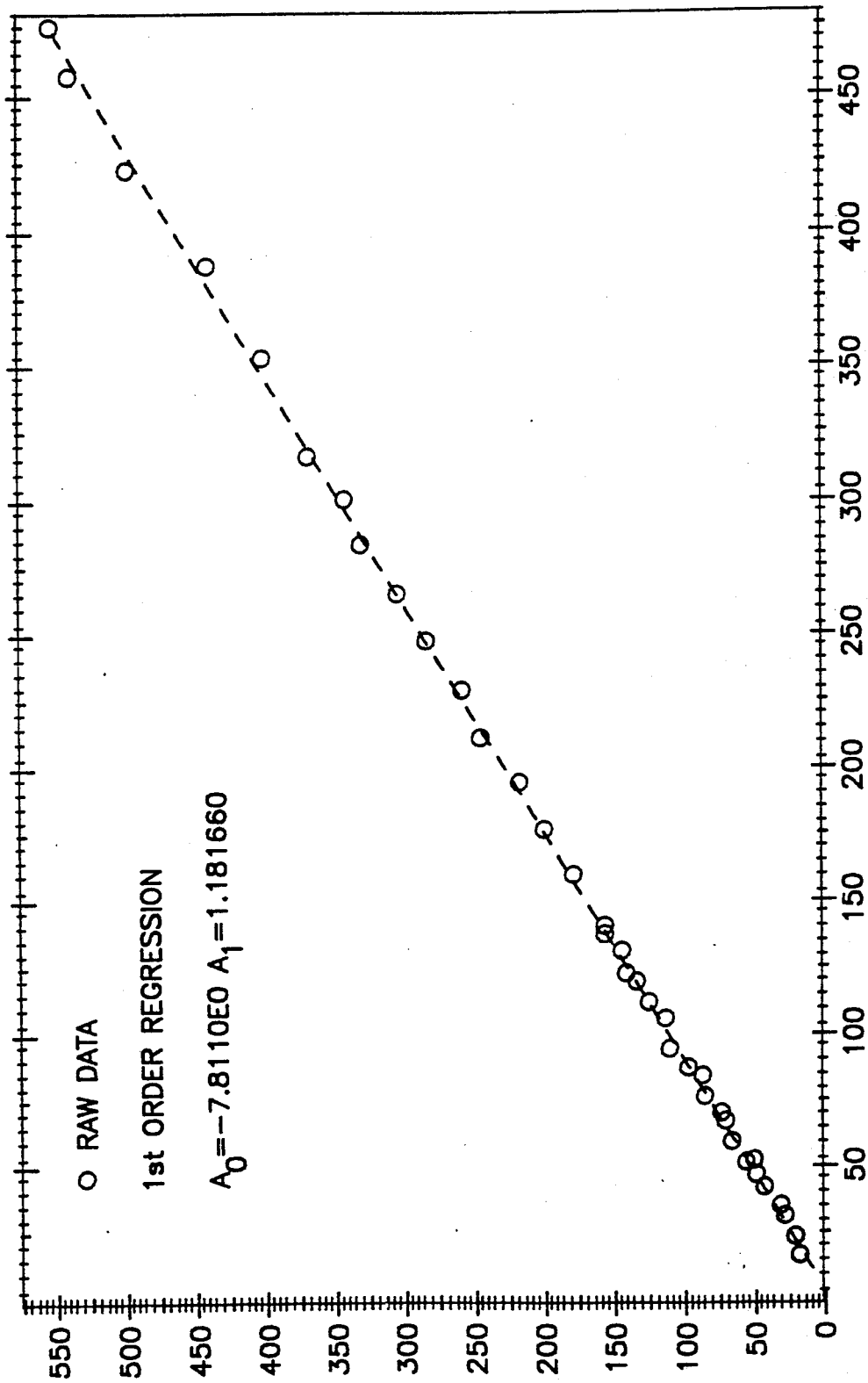
FIG. 10 is a table indicative of the calibration data stored in accordance with the invention.

The value of T2 will vary between the minimum and maximum values (40 ms. and 230 ms. in the example cited) in a substantially, but not necessarily completely, linear form. However, to determine the correct weight from the value of T2, the signal is processed and the correct weight determined from calibration data stored in microprocessor 210 which correspond to a deliar calibration curve of corresponding values as shown in FIG. 10. The left scale of the calibration curve indicates the calibration number which corresponds to a signal calculated from processing of the signal output from the timer 220 and is proportionate to T2 and $R_3$. The horizontal scale indicates the weight in ounces applied to the spring which corresponds to the calibration number. The values of the table are stored in the microprocessor 210. The microprocessor is programmed such that the proper value for the weight may be determined and outputted from the microprocessor to the display 230. The six key control panel 240 provides the electrical interconnection between controls 32, 34, 36, 38, 40 and 42 and the microprocessor 210.

It should be further noted that the ratio of T2 to T1 is directly proportionate to the ratio of $R_3$ to $R_T$, and thus any variation in the tolerance or value of the circuit components will not affect the ratio. This improves the accuracy of the measurement system.

In determining the weight applied to the scale, the microprocessor is programmed to respond to the difference in the value of T2 when the weight to be measured is applied to the spring and the value of T2 when there is no weight applied to the spring. The weight is proportionate to this difference divided by T1, which is also proportionate to the difference between the value of $R_3$ when the weight to be measured is applied to the spring and the value of $R_3$ when no weight is applied to the spring, divided by the total resistance $R_T$.

The microprocessor 210 counts the number of low-value samples outputted by timer 220 by detecting the transition and the output wave form from timer 220 from a high-value state to a low-value state. The sampling may be performed by comparing the current count with a previous count to determine equality between the counts, or by the fixed number iterations sampling the output wave from the timer. The low-value count when no weight is applied is subtracted from the stabilized low-value count when the weight is applied to the string to obtain a normalized low-value count. That normalized value is divided by the high-value count.

This normalized and divided value is compared to the calibration table data stored in the microprocessor to determine the appropriate binary coded decimal output signal to be outputted to the display 230 such that the weight or other values is correctly displayed. A light emitting diode display or a paper printer may also be used for the display. The microprocessor is electrically interconnected to the control buttons collectively identified as control panel 240, and including keys 32, 34, 36, 38, 40 and 42 described elsewhere.

The conversion table between values of $R_3$ and corresponding weights may be assembled by subjecting the spring to successive controlled weights and reading the value generated by the microprocessor which corresponds to the normalized low-value count divided by the high-value count of the timer wave output. The generation of such a table obviates the need for additional scaling for parameters such as the spring constant, since these factors are already taken into account.

The microprocessor has the ability to store values in the off state. The processing program and the conversion table are stored in read only memory in the microprocessor. Random access memory in the microprocessor is used for working storage. This random access memory is used for storing the total weight measured, the most recent weight measured, and the largest weight measured. The largest weight measured is recalled by pushing the corresponding button (32 in FIG. 2). The total weight measured, a sum of selected individual weights previously measured, is displayed by pushing button (36 in FIG. 2). The most recent weight measured is displayed automatically when the on/off switch 42 is activated, and is displayed automatically a few moments after the total weight button 36 or the maximum weight button 32 are activated.

Pressing the ENTER key 40 causes the displayed weight to be retained and added to the total weight stored and displayed when total weight button 36 is activated. Pressing the enter key also causes the displayed weight to be compared to the maximum weight stored and displayed when button 32 is activated.

In an alternative embodiment of the present invention, a different variable resistor is used such that the effective range of the weights measured by the scale may be increased. The length of variable resistor $R_T$ will limit the range of weights measurable by the scale. The conductive element 204, shown in FIG. 8, cannot be extended beyond the ends of variable resistor $R_T$. However, the displacement of the conductor 204 which may be measured by the circuitry is increased if a multi-turn variable resistor gear arrangement is used, as shown in FIG. 10. Displacement of the spring arm 254 will displace rigid coupling 202' and will correspondingly displace the gear tooth arm 310. Displacement of the gear tooth arm 310 results in rotation of the gear wheel 320. This rotation is transferred by belt 330 to a multi-turn potentiometer 340 which converts the linear motion of arm 310 into a changed resistance RP, which is processed as $R_3$ in the embodiment using the sliding-scale variable resistor described above.

What is claimed is:

1. An apparatus for electronically measuring and displaying weight comprising:
   (a) spring means for generating a substantially linear response to a force imparted thereto;
   (b) a variable resistor;
   (c) displacement indicating means rigidly connected to the spring means for displacement therewith in response to said force, said displacement indicating means further connected to said variable resistor such that the amount of change in the effective resistance of the variable resistor is substantially proportionate to the amount of physical displacement of the displacement indicating means;

(d) electronic circuit means for generating a periodic electrical signal having a period substantially indicative of the effective resistance of the variable resistor;

(e) display means for converting the electrical signal generated by the electronic circuit means into a display substantially indicative of the force imparted to the spring means; and (f) hook means interconnected to said spring means for imparting a force on said spring means when a force is applied to the hook.

2. An apparatus for electronically measuring and displaying weight in accordance with claim 1 further comprising:

(g) a watertight, generally floatable housing substantially enclosing the spring means, variable resistor, displacement indicating means, electronic circuit means, and display means.

3. An apparatus for electronically measuring and displaying weight comprising:

(a) spring means for generating a substantially linear response to a force imparted thereto;

(b) a variable resistor;

(c) displacement indicating means rigidly connected to the spring means for displacement therewith in response to said force, said displacement indicating means further connected to said variable resistor such that the amount of change in the effective resistance of the variable resistor is substantially proportionate to the amount of physical displacement of the displacement indicating means;

(d) electronic circuit means for generating an electrical signal substantially indicative of the effective resistance of the variable resistor comprising:

(i) wave generating means electrically interconnected to the variable resistor means for generating an electric wave signal indicative of the effective resistance of the variable resistor; and (ii) microprocessor means for receiving the electric wave signal generated by the wave generating means, processing the signal to determine the weight value corresponding to the variable resistor effective resistance, and outputting a weight-indicating signal indicative of said effective resistance to a display means;

(e) display means for converting the weight-indicating electrical signal generated by the microprocessor means into a numeric display substantially indicative of the force imparted to the spring means; and (f) hook means interconnected to said spring means for imparting a force on said spring means when a force is applied to the hook.

4. An apparatus in accordance with claim 1 wherein the variable resistor comprises a sliding resistor having a sliding element rigidly connected to the displacement indicating means.

5. An apparatus in accordance with claim 1 wherein the variable resistor comprises a rotatingly variable resistor interconnected to a rotating gear which turns in response to linear movement of the displacement indicating means.

6. An apparatus in accordance with claim 3 wherein the wave generating means comprises a voltage controlled oscillator for generating a square wave having a first state having a substantially constant duration and a second state having a duration substantially proportionate to the effective resistance of the variable resistor.

7. An apparatus in accordance with claim 3 wherein the microprocessor means comprises a sampling means for sampling the wave generated by the wave generating means and means for storing and processing the values sampled.

8. An apparatus in accordance with claim 7 wherein the sampling means comprises means for storing the number of high-value samples and low-value samples received within a predetermined period, means for calculating the difference between the number of low-value samples stored and a number indicative of the number of low-value samples received when no force is applied to the spring means, and means for dividing the difference calculated by the number of high-value samples stored.

9. An apparatus in accordance with claim 3 wherein the microprocessor means further comprises storing means for storing calibration data including the weight corresponding to the processed signal stored in the microprocessor means and generated from the signal received from the wave generating means.

10. An apparatus in accordance with claim 3 wherein the microprocessor means further comprises accumulated total storing means for calculating and storing an accumulated total of a plurality of weights; and wherein the display means further comprises means electrically interconnected with said accumulated total storing means for displaying said accumulated total when the control means is activated.

11. An electronic fish scale comprising:

(a) spring means for generating physical displacement of a spring arm member substantially proportionate to the weight applied to the spring;

(b) a spring arm member interconnected with the spring such that the spring arm member linearly moves a distance substantially proportionate to a weight applied to the spring means;

(c) a rigid coupling means rigidly secured to the spring arm member;

(d) a variable resistor indicative of a resistance which varies with the physical movement of a conductor arm slidingly connected thereto;

(e) a conductor arm rigidly connected to said rigid coupling means and slidingly connected to said variable resistor;

(f) a timer circuit electrically interconnected with a capacitor, a fixed resistance, and the variable resistor for generating a square wave having a high output state having a substantially constant duration and a low output state substantially proportionate to the value of the variable resistor;

(g) a microprocessor electrically connected to the timer circuit for sampling the square wave generated by the timer circuit, storing values indicative of the duration of the high output state and low output state of the square wave, and processing said stored values to generate an electric signal indicative of the weight applied to the spring means; and (h) display means interconnected to the microprocessor for receiving the electric signal generated by the microprocessor and displaying a digital readout indicative of the value to be displayed.

* * * * *